United States Patent [19]

Guillon

[11] Patent Number: 4,969,293

[45] Date of Patent: Nov. 13, 1990

[54] GUIDING SLIDEWAY STRIP FOR A MOVING GLASS, IN PARTICULAR THE GLASS OF A CAR WINDOW

[75] Inventor: Henri Guillon, Vaux-sur-Seine, France

[73] Assignee: Hutchinson, Paris, France

[21] Appl. No.: 385,589

[22] Filed: Jul. 25, 1989

[30] Foreign Application Priority Data

Jul. 28, 1988 [FR] France ............................ 88 10192

[51] Int. Cl.$^5$ .............................................. E06B 7/16
[52] U.S. Cl. ...................................... 49/441; 49/442; 49/374
[58] Field of Search .............................. 49/440–443, 49/489, 374, 375, 377

[56] References Cited

U.S. PATENT DOCUMENTS

| 3,918,206 | 11/1975 | Dochnahl | 49/441 |
|---|---|---|---|
| 4,530,186 | 7/1985 | Guillon | 49/441 |
| 4,553,354 | 11/1985 | Barbero | 49/441 X |
| 4,704,820 | 11/1987 | Kisanuki | 49/441 |
| 4,800,681 | 1/1989 | Skillen et al. | 49/441 X |
| 4,897,298 | 1/1990 | Otawa et al. | 49/441 X |
| 4,908,989 | 3/1990 | Omura et al. | 49/441 |

FOREIGN PATENT DOCUMENTS

| 127591 | 5/1984 | European Pat. Off. |
| 200618 | 4/1986 | European Pat. Off. |
| 2165229 | 8/1973 | France. |
| 2307450 | 5/1976 | France. |
| 2551129 | 8/1983 | France. |

Primary Examiner—Gary L. Smith
Assistant Examiner—Jerry Redman
Attorney, Agent, or Firm—Bell, Seltzer, Park & Gibson

[57] ABSTRACT

A slideway strip for guiding a moving glass, in particular a car window glass, and intended to co-operate with a T-section shoe mounted on the glass, the strip comprising a generally channel section frame having a base (14) and two flanks (15, 16) with the ends of the flanks having respective sealing lips (21, 22) mounted thereon and made of a material softer than the frame material. The strip also has ribs (17, 17a) connected to its base via respective risers which leave shoe-receiving grooves (18, 18a). The strip is suitable for constituting car window weather strip.

13 Claims, 2 Drawing Sheets

GUIDING SLIDEWAY STRIP FOR A MOVING GLASS, IN PARTICULAR THE GLASS OF A CAR WINDOW

The present invention relates to a guide strip for guiding surfaces that may be moved, such as the glass used for car windows, metal surfaces, or the like, and in particular it relates to a strip comprising a section member or guiding slideway made of a resilient material such as rubber or plastic, for example.

BACKGROUND OF THE INVENTION

Such guiding slideways are intended not only to perform a guidance function as their name implies, but also to seal the moving surfaces with respect to external agents, and in particular rain, but also noise, and to prevent any blade, hook, metal wire or other burglary tool, however fine, from being inserted. These components are widely used and perform an important function, in particular in motor vehicles.

A large number of guiding slideways for car windows have been proposed in the prior art for solving the combined problem of sealing the moving surface in the manner mentioned where it meets the fixed frame in which it is assembled, while nevertheless not hindering the sliding of the moving surface when it is moved relative to the fixed frame.

The solutions proposed to these two problems have caused window sealing strips to be put on the market which are essentially constituted by two sealing lips carried on a generally channel-section member, with the two lips bearing against respective faces of the glass and being coated over those portions of their surfaces which come into contact with the glass by means of a coating for facilitating sliding of the glass, with an analogous coating being preferably also deposited on the bottom surface of the slideway where it is liable to made contact with the edge of the moving surface, referred to below as a car glass or window in order to facilitate and simplify reading the description, but with this being purely by way of non-limiting example.

Reductions in vehicle weight, new aesthetic and aerodynamic shapes, and simplifications to window drive mechanisms all lead to a glass-maneuvering system which supports the glass at one point only which means that it has become necessary to provide retaining means in order to prevent the glass from rotating while it is being maneuvered. To this end, proposals have been made to fix a shoe of uniform section, e.g. of Γ-shape or of T-shape, on one of the top corners of the glass, and generally its rear top corner, and to make the shoe cooperate with one or two ribs as the case may be provided for that purpose on the slideway and providing guidance grooves for the shoe.

Prior solutions of this type are not entirely satisfactory, either because they provide a slideway which is very simple in shape in which the sealing lips themselves are shaped to include respective rear stepped portions constituting shoe-guiding grooves (JP-A-6 124 203), or else, on the contrary, because they propose a slideway having projections which are distinct from the lips (FR-A-2 551 129). In the first case, the advantage of simple slideway construction is nevertheless accompanied by prohibitive drawbacks: firstly the section shape of the shoe must be complex including a narrow portion and requiring a cut-out in the glass, and secondly, the sealing function of the lips is impaired due to the effect of the torsion stresses imposed by the shoe. This second drawbacks also occurs, although to a lesser extent, in the second case since the projections are carried, like the lips, on the sides of the slideway.

The object of the invention is to provide a guiding slideway strip which avoids the above-mentioned drawbacks, in which the lips are completely protected by the construction of the slideway against any force that the shoe may exert on the slideway, and also enabling a glass to be mounted simply in a slideway either before or after being mounted on the vehicle.

SUMMARY OF THE INVENTION

In a slideway strip of the invention, and unlike prior slideway strips, instead of being mounted in the immediate proximity of the lips and/or of being formed by projections from the flanks of the channel section member to which the lips are connected, the, or each, shoe-guiding groove is defined by one or more ribs projecting from the base of the body of the sealing strip constituting the slideway.

More particularly, the present invention provides a slideway strip for guiding a moving glass, in particular a car window glass, the strip serving both to seal and to guide a glass provided with a shoe including at least one projecting portion extending perpendicularly from the mean plane of the glass and intended to be received in a generally channel-section frame, said strip including a base and two flanks which are substantially parallel to each other and perpendicular to said base when in the assembled condition, and also including two sealing lips connected to respective ones of the edges of said flanks furthest from the base, the strip further including at least one rib having a shoulder, projecting from a riser and co-operating with the base of the strip to provide a groove for guiding the shoe.

The base and the flanks of the slideway strip may be made of identical materials or of different materials, and they may be of equal hardness or of different hardness, being preferably made of materials having a hardness on the Shore D scale of about 50, e.g. thermoplastic materials, TPE, or elastomers, while the sealing lips and the retaining projections may be made of materials which are identical or different and whose hardness lies in the range 25 to 75 on the Shore A scale, e.g. compact cellular materials or elastomers.

In combination with the above, the flanks of the strip may be connected to its base by portions made of material which is softer and more deformable than the base and the flanks, and advantageously integral with the projections for maintaining the slideway in the frame which is to receive it.

The portions of the slideway strip that come into contact with the glass and the shoe are advantageously provided with a coating for facilitating sliding, said coating being of the fiber or hairy type, being made by floccing, or else being made of a plastic material having a low coefficient of friction, such as a polyolefin or polytetrafluoroethylene, for example. Such a coating for facilitating sliding considerably reduces friction forces during motion of the glass. The coatings on the sealing lips and on the, or each, rib are respectively adapted to facilitate the sliding of glass and to facilitate the sliding of the guide shoe.

In a particularly advantageous embodiment of the invention, this sliding coating is made by coextruding a polyolefin or polytetrafluoroethylene with the other material(s), preferably one or more elastomers or plastomers constituting the various portions of the slideway strip on which the coating is placed.

In a preferred embodiment of the invention, the, or each, projection is connected to the base by one or more risers directed substantially parallel to the flanks when the slideway strip is in the mounted oonfiguration. Advantageously, these risers are connected to the base of the slideway strip by means of fillets.

In a first embodiment provided for guiding a glass fitted with a T-shaped shoe, the slideway includes two symmetrical guide ribs and the coating for facilitating sliding is interrupted at the joins between the projections and said risers, and between said risers and the base, in order to facilitate inserting the shoe in the grooves delimited by the projections.

In another embodiment, for guiding a glass provided with a Γ-shaped shoe, the slideway strip includes only one shoe guiding rib, and a coating for facilitating sliding is also placed on a portion of the inside surface of the flank connected to the side of the base which is furthest from the rib, said coating and the coating on the rib being interrupted at their respective joins with the base in order to facilitate inserting the glass and its shoe. The coating on the flank may optionally be interrupted, preferably substantially in the middle thereof. The coating on the base may also be interrupted substantially in its middle in order to facilitate inserting the shoe.

Advantageously, when the slideway strip is to be mounted in a frame including at least one curved-over fastening profile, the channel section portion of the slideway strip includes a flexible rim shaped so as to fit closely over the fastening profile and connected to one of the sealing lips.

Advantageously, the rim is made of the same material as the sealing lips.

The sealing lips are generally made of a resilient material of lower hardness; than the flanks and the base of the slideway, and optionally having the same hardness as said curved portion of the channel section and/or of the projections or ribs for holding the slideway in the window frame.

BRIEF DESCRIPTION OF THE DRAWINGS

Embodiments of the invention are described by way of example. With reference to the accompanying drawings, in which.

DETAILED DESCRIPTION

Figure 1:
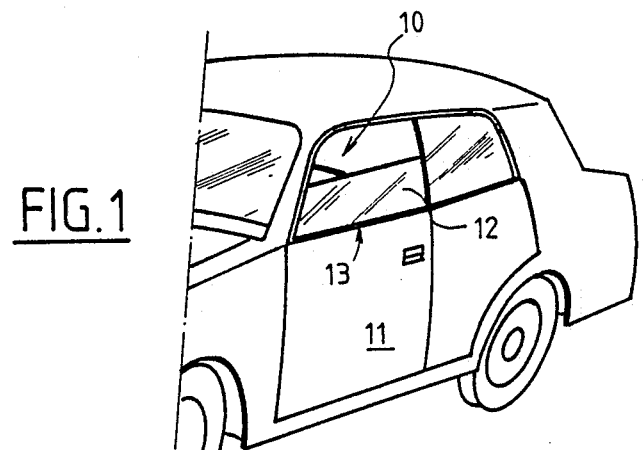
FIG. 1 is a fragmentary view of a car showing an example of how the of the invention can be applied.

In the door of the car 11, shown in part in FIG. 1, the window 12 is shown as being half-down. Bottom sealing for said window glass against rain or sand or dust, and more generally against the insertion of any gaseous, liquid, or solid particle or element, and also against sound waves, is provided by at least one bottom wiper seal 13; whereas sealing round the top and the sides of the window is provided, simultaneously with guidance for the window, by slideway strips surrounding the window bay 10 and fixed is a frame which is generally made of metal, usually in the form of a channel section member, and fixed to the door of the vehicle (except for open-top vehicles in which case at least one of the slideway strips is fixed to a fixed riser).

Figure 2:
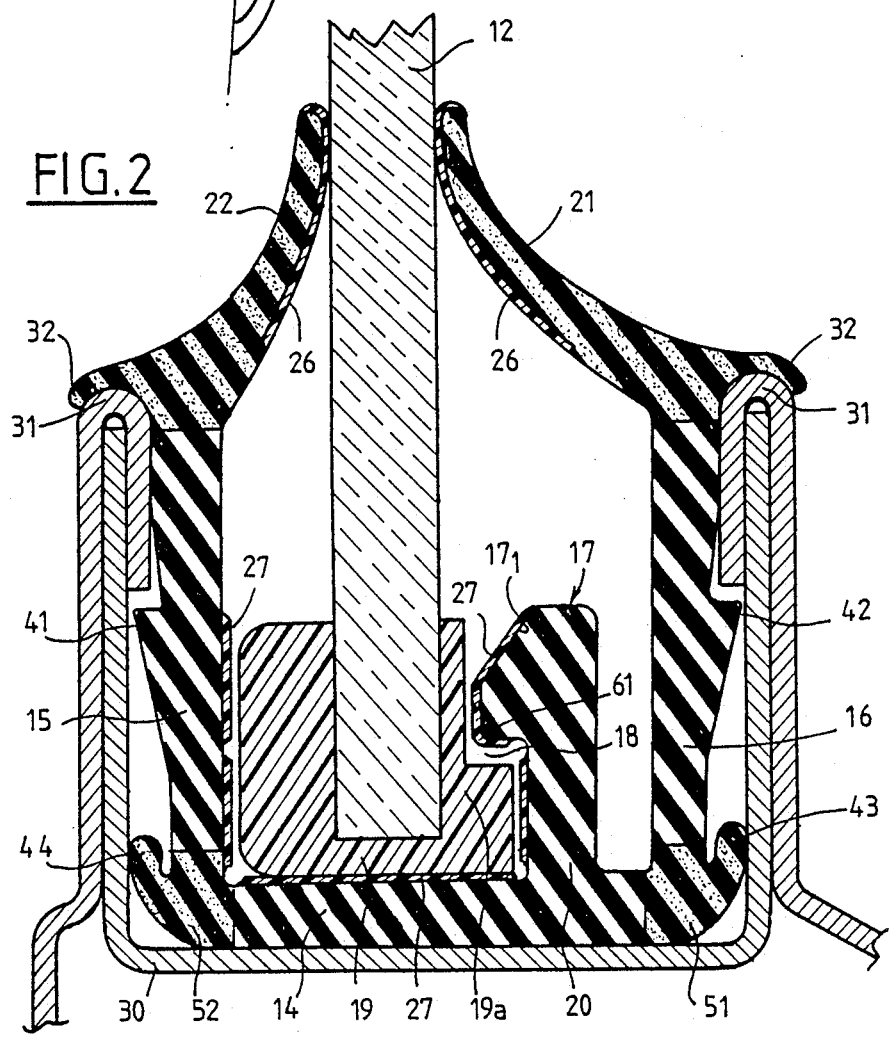
FIG. 2 is a cross-section through a first embodiment of a slideway strip in accordance with the invention mounted in the win of a car door.

As shown in FIG. 2, a slideway of the invention is constituted by a base 14 two flanks 15 and 16 extending substantially perpendicularly to the base 14 which the strip is mounted in the frame 30, and two sealing lips 21 and 22 respectively connected to the edges of the flanks 15 and 16 furthest from the base. The strip also includes means for fixing it to the frame 3U such as abutments 41 and 42, and projections 43 and 44, with the lips 21 and 22 and the means 41 to 44 for fixing the strip to the frame 30 being made of a resilient material, in perpendicular an elastomer or a plastomer such as rubber, or PVC. In the example described and shown, the frame 30 includes a fastening profile 31 whcse edges co-operate with the abutments 41 and 42 and the strip has a profiled rim 32 running along the opposite side of the lips to the side making contact with the glass 12 and curved to fit over the curve of the profile 31. The rim 32 is preferably made of a material which is more flexible than the base 14 and the flanks 15 and 16 which are preferably made of one or more relatively hard resilient materials, while the projections 43 and 44 are advantageously made of a selectively flexible material, as are the link portions 51 and 52 between the base 14 and the flanks 15 and 16.

In order to guide the glass, a guide shoe 19 is fixed to one of the corners thereof by any appropriate means, e.g. gluing, screwing, or co-operation between studs and a hole in the glass. The shoe is a section member having a Γ-shaped section in this case and the slideway includes a rib 17 provided at the end of a riser 20 standing on the base 14 and made of the same material as the base. The riser 20 runs substantially parallel to the flanks 15 and 16 when the strip is assembled, and together with the rib 17 it forms a section member having a F-shaped cross-section with the overhang or shoulder 61 from the rib 17 and the base 14 together delimiting a groove 18 for receiving the head 19a projecting from the shoe 19.

Figure 3:
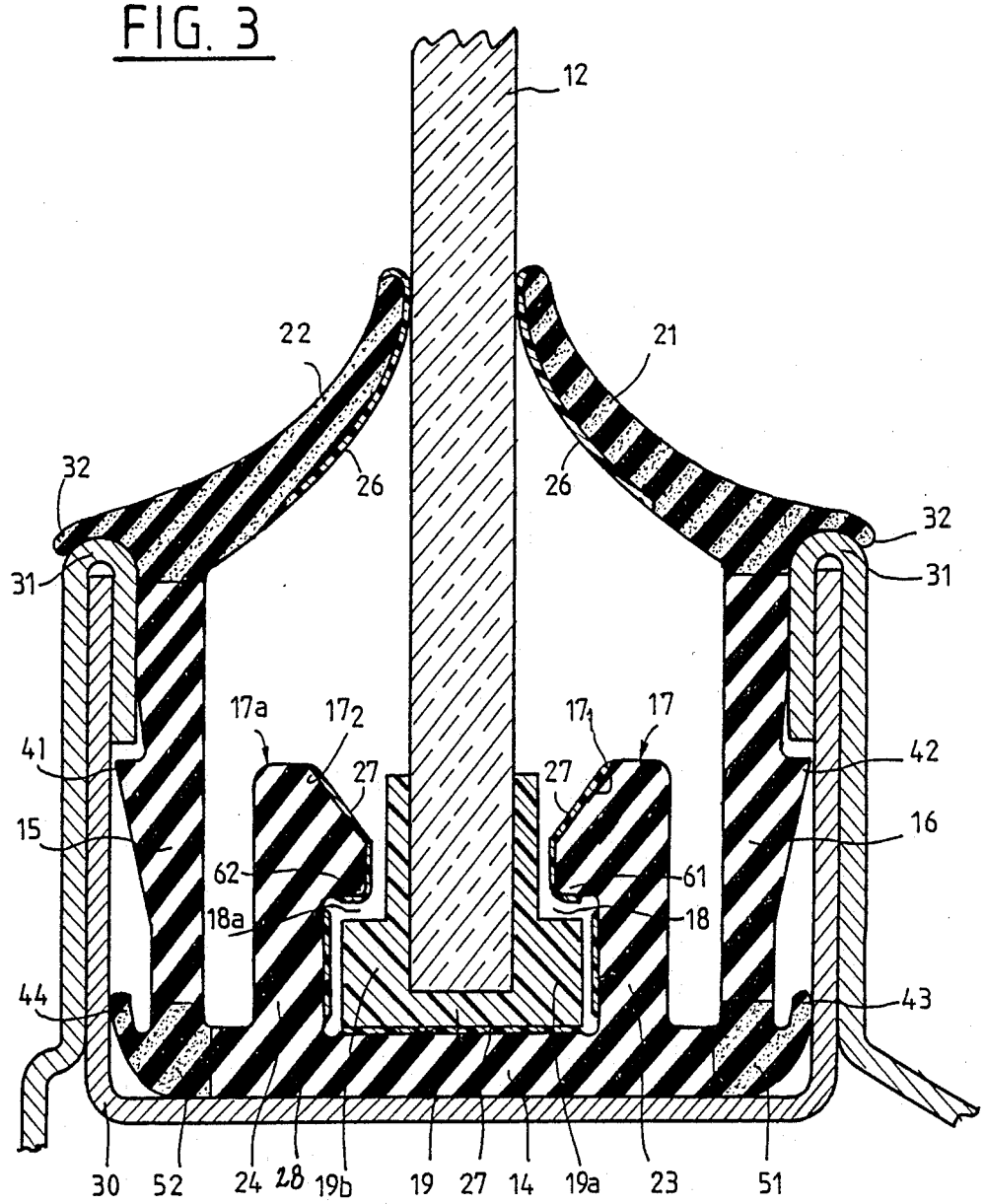
FIG. 3 is a cross-section through a second embodiment of a slideway strip in accordance with the invention mounted in the window bay of a car door.

In the variant shown in FIG. 3, two risers 23 and 24 are made of the same material as the base 14 and stand on the base of the slideway, with said riders being substantially parallel to each other and to the flows 15 and 16 when the strip is in position. As in the embodiment shown in FIG. 2, the risers 23 and 24 carry respective ribs 17 and 17a at their free ends, which ribs have a cross-section in the form of a rectangular trapezium including sloping surfaces $17_1$ and $17_2$ facing each other symmetrically about the midplane of the glass 12.

Also like the processing embodiment, the ribs 17 and 17a together with the base 14 and their own overhangs 61 and 62 delimit respective grooves 18 and 18a for receiving the projections 19a and 19 b of the shoe 19.

The sealing lips 21 and 22, the sloping faces $17_1$ and $17_2$, the ribs 17 and 17a, and the faces delimiting the, or each, groove in which the shoe 19 slides, and in the embodiment shown in FIG. 2 the surface of the flank 15 over which the shoe also slides, are all coated with a substance for improving sliding, which is represented at 26, 27, and 28, and which may be constituted, for example, by fiber or hair floc, or else in a variant by a polyolefin or polytetrafluoroethyelene layer which is advantageously interrupted where it meets the base.

Discontinuitities in the sliding coating, substantially in the middle of the base, and in the example shown in FIG. 2, substantially in the middle of that portion of the flank 15 which is coated with a 27, are also advantageous.

The strip is preferably made by coextruding the various materials from which it is made up, in which case it is made by being extruded (or coextruded) in a deployed shape which is subsequently shaped by folding up the flanks 14 and 15, with such folding being facilitated by the reduced hardness of the portions 51 and 52 which act as hinges, and also being facilitated by the discontinuities in the coating 27.

When the base 14 and the flanks 15 and 16 of the strip are made of materials which are not sufficiently resilient to enable the glass to be snap-fitted in the slideway strip, then the strip is put into place astride the glass including its shoe, and the glass plus strip assembly is then mounted on the vehicle.

The invention is naturally not limited to the embodiments described and/or shown, is it is limited to application to slideway strips for car windows, but it extends mutatis mutandis to any slideway strip for a moving surface, whether vertical or otherwise.

I claim:

1. A slideway strip for guiding a moving glass, in particular a car window glass, the strip serving both to seal and to guide a glass provided with a shoe including at least one projecting portion extending perpendicularly from the mean plane of the glass and intended to be received in a generally channel-section frame, said strip including a base and two flanks which are substantially parallel to each other and perpendicular to said base when in the assembled condition, and also including two sealing lips connected to respective ones of the edges of said flanks furthest from the base, the strip further including at least one riser protruding from said base between said flanks, said riser being fitted with a rib having a shoulder projecting from said riser and co-operating with the base of the strip to provide a groove for guiding the shoe.

2. A strip according to claim 1, wherein said rib has a sloping face facilitating insertion of the glass in the strip.

3. A strip according to claim 1, wherein the base, the flanks and the, or each, rib for guiding the shoe are made of harder material(s) than the sealing slips.

4. A slideway strip for guiding a moving glass, in particular a car window glass, the strip serving both to seal and to guide a glass provided with a shoe including at least one projecting portion extending perpendicularly from the mean plane of the glass and intended to be received in a generally channel-section frame, said strip including a base and two flanks which are substantially parallel to each other and perpendicular to said base when in the assembled condition, and also including two sealing lips connected to respective ones of the edges of said flanks furthest from the base, the strip further including at least one riser protruding from said base between said flanks, said riser being fitted with a rib having a shoulder projecting from said riser and co-operating with the base of the strip to provide a groove for guiding the shoe, wherein the flanks of the strip are connected to the base via portions made of material which is softer than the material of the base and the flanks, said portions being integrally formed with means for fixing the strip in the frame.

5. A strip according to claim 1, wherein the portions of the strip coming into contact with the glass and the shoe are provided with a coating for facilitating sliding.

6. A strip according to claim 1, wherein a fillet is provided at the junction between the base and the, or each, riser.

7. A strip according to claim 1, for providing guidance and sealing for a glass provided with a T-section shoe, wherein the strip includes two risers and two guide ribs disposed substantially symmetrically about the mean plane of the strip, and further including a coating upon said risers and said guide ribs and said base for facilitating sliding, said coating being interrupted at the connections between said ribs and said risers and between said risers and said base.

8. A strip according to claim 1, for providing guidance for a glass provided with a Γ-section shoe, wherein the strip includes a single guide rib, and further including a coating for facilitating sliding, said coating being placed on the rib and also placed on a portion of the inside face of the flank connected to that side of the base which does not include the rib, said coating being interrupted at the respective joints between the flank and the base, between the base and the riser, and between the riser and the rib.

9. A strip according to claim 8, wherein said coating on the flank is discontinuous, being interrupted substantially in the middle.

10. A strip according to claim 1, for mounting in a frame including at least one curved-over fastening profile, wherein the strip includes at least one flexible rim shaped so as to fit closely over the fastening profile, said rim being connected to one of the sealing lips and being made of the same material as the sealing lips.

11. A strip according to claim 5, wherein portions of said strip are made by coextrusion of a polyolefin or of polytetrafluoroethyelene with other material on which said coating is placed, said other material being from the group consisting of elastomers and plastomers.

12. A strip according to claim 3, wherein the hardness of the material(s) constituting the base, the flanks, the ribs, and the risers carrying the ribs is about 50 on the shore D scale.

13. A strip according to claim 3, and further including fixing means for fixing the strip within the frame and linking portions between the base and the flanks, wherein the hardness of the material(s) constituting the sealing lips, the fixing means, and the linking portions between the base and the flanks, lies in the range 25 to 75 on the Shore A scale.

* * * * *

UNITED STATES PATENT AND TRADEMARK OFFICE
CERTIFICATE OF CORRECTION

PATENT NO.  : 4,969,293
DATED       : November 13, 1990
INVENTOR(S) : Henri Guillon It is certified that error appears in the above-identified patent and that said Letters Patent is hereby corrected as shown below:

Column 3, line 48, after "the" (first occurrence) insert
  -- strip --

Column 3, line 51, "win" should be -- window bay --

Column 3, line 66, "is" (first occurrence) should be
  -- in --

Column 4, line 9, "3U" should be -- 30 --

Column 4, line 24, "selectively" should be
  -- relatively --

Column 4, line 36, "F-shaped" should be -- Γ-shaped --

Column 4, line 43, "flows" should be -- flanks --

Column 5, line 16, after "shown," insert -- nor --

Column 5, line 41, "slips" should

Signed and Sealed this

Twenty-eighth Day of April, 1992

*Attest:*

HARRY F. MANBECK, JR.

*Attesting Officer*   *Commissioner of Patents and Trademarks*